United States Patent [19]
Sawamura et al.

[11] Patent Number: 5,980,625
[45] Date of Patent: Nov. 9, 1999

[54] CALCIUM PHOSPHATE COMPOSITION AND A SETTING SOLUTION THEREFOR

[75] Inventors: Takenori Sawamura; Masateru Hattori, both of Aichi, Japan

[73] Assignee: NGK Spark Plug Co., Ltd., Japan

[21] Appl. No.: 09/041,390

[22] Filed: Mar. 12, 1998

[30] Foreign Application Priority Data

Mar. 13, 1997 [JP] Japan ..................................... 9-082355

[51] Int. Cl.$^6$ .............................. C04B 12/02; C08L 5/06; A61C 13/00; A61F 2/02
[52] U.S. Cl. ......................... 106/35; 106/162.1; 106/691; 433/199.1; 433/201.1; 433/212.1; 433/228.1; 536/2; 623/11; 623/13; 623/16
[58] Field of Search ......................... 106/35, 691, 162.1; 501/1; 433/199.1, 201.1, 212.1, 228.1; 606/76; 623/11, 13, 16; 536/2

[56] References Cited

U.S. PATENT DOCUMENTS

| Re. 33,161 | 2/1990 | Brown et al. ............................. | 106/35 |
| 5,180,426 | 1/1993 | Sumita ....................................... | 501/1 |
| 5,281,404 | 1/1994 | Sumita ....................................... | 501/1 |

FOREIGN PATENT DOCUMENTS

| 0 298 501 | 4/1992 | European Pat. Off. . |
| 0 323 632 | 7/1992 | European Pat. Off. . |
| 0 436 499 | 10/1996 | European Pat. Off. . |
| 2-102165 | 4/1990 | Japan . |
| 3-112843 | 5/1991 | Japan . |
| 3-141955 | 6/1991 | Japan . |
| 7-289627 | 11/1995 | Japan . |

OTHER PUBLICATIONS

WPIDS Abstract No. 81–87939D, abstract of Japanese Patent Specification No. 56–131375, Oct. 1981.
WPIDS Abatract No. 83–823239, abstract of Japanses Patent Specification No. 58–174306, Oct. 1983.
WPIDS Abstract No. 90–324536, abstract of Japanese Patent Specification No. 02–232057, Sep. 1990.
WPIDS Abstract No. 90–380376, abstract of Japanese Patent Specification No. 02–275812, Nov. 1990.
WPIDS Abstract No. 91–026448, abstract Japanese Patent Specification No. 02–297374, Dec. 1990.

*Primary Examiner*—Anthony Green
*Attorney, Agent, or Firm*—Finnegan, Henderson, Farabow, Garrett & Dunner, L.L.P.

[57] ABSTRACT

The present invention provides a setting solution for calcium phosphate cement as well as a calcium phosphate cement composition. The setting solution does not cause disintegration of the composition when the composition is used immediately after preparation. The content of the pectin in the setting solution is 0.5–10% by weight per 100% by weight of the solution. The setting solution has a pH of 3–5, and a viscosity of not more than 200 dPa·s. The calcium phosphate may be selected from the group consisting of tetracalcium phosphate, calcium hydrogen phosphate, tricalcium α-phosphate, tricalcium β-phosphate, and hydroxyapatite.

19 Claims, No Drawings

CALCIUM PHOSPHATE COMPOSITION AND A SETTING SOLUTION THEREFOR

BACKGROUND OF THE INVENTION

1. Field of the Invention

The present invention relates to a setting solution for calcium phosphate cement and to a calcium phosphate cement composition containing the setting solution. The setting solution and the composition of the present invention are useful in the medical and dental fields. Particularly, the composition containing the setting solution and calcium phosphate cement of the invention is advantageously used to form, for example, artificial bone, artificial tooth roots, and artificial joints which have both excellent strength and excellent compatibility with living tissue.

2. Description of the Related Art

Numerous different compositions of medical cement used for the living body have so far been proposed. Among such compositions, biocompatible cement of the calcium phosphate type yields hard material of excellent biotropism, since the cement powder transforms into hydroxyapatite as the powder sets.

After being kneaded, a conventional mixture of calcium phosphate-type biocompatible cement and pure water sets in 10–20 minutes in air. However, when the mixture is immediately immersed in water after being kneaded, powder disperses into the water before the mixture is set, causing the mass of cement to disintegrate. Therefore, in the case in which such a biocompatible cement is placed in the living body—which contains large amounts of body fluid—some countermeasures must be taken. For example, a kneaded mixture may be allowed to set to a certain degree before being put in the living body. Alternatively, the body fluid present in the location receiving the cement is first removed, then hemostasis and other similar treatment is performed, and subsequently the kneaded material is placed in the body.

However, cement which is set to a certain degree is difficult to handle and may cause incorrect shaping. Moreover, removal of body fluid and hemostasis require human hands and time. To solve these problems, there has been proposed a preparation containing a cement powder and a specified setting solution. For example, U.S. Pat. No. 4,612,053 discloses the addition of acid to a setting solution to shorten the setting time and thereby reduce the extent of disintegration. Japanese Patent Application No. 77261/1990 discloses addition of chitosan to a setting solution to further suppress dispersion of powder and disintegration of the cement. However, if a cement and a setting solution containing an acid is placed in the living body, the acid irritates the skin considerably and can cause an inflammatory reaction in the vicinity of the filled portion. In addition, in order to dissolve chitosan, the pH of the aqueous solution must be adjusted to 1–2, which as a matter of course requires addition of an acid, raising the inflammation problem again.

SUMMARY OF THE INVENTION

According to a first aspect of the present invention, there is provided a setting solution for calcium phosphate cement, which solution enables immediate use for filling of a mixture containing powder and the setting solution without inducing dispersion of powder or disintegration of cement.

More specifically, the setting solution for calcium phosphate cement comprises an aqueous solution of pectin, wherein the content of the pectin with respect to the entirety of the setting solution is 0.5–10% by weight, more preferably 0.8–5% by weight, and most preferably 14% by weight, per 100% by weight of the solution.

Preferably, the pH of the setting solution is 3–5, more preferably 3.2–3.6.

Pectin may be pectin per se, pectic acid, or pectinic acid.

According to a second aspect of the present invention, there is provided a composition containing the above-mentioned setting solution and a calcium phosphate cement powder, which composition eliminates the necessity for removal of body fluid, hemostasis, or the like, while maintaining a predetermined shape of the cement mixture.

More specifically, the composition comprises a calcium phosphate cement powder and a setting solution comprising an aqueous solution of pectin, wherein the content of the pectin with respect to the entirety of the setting solution is 0.5–10% by weight per 100% by weight of the solution.

Preferably, the content of pectin with respect to the entirety of the setting solution is 0.8–5% by weight, and most preferably 14% by weight, per 100% by weight of the solution.

Preferably, the proportion of the amount of setting solution with respect to that of powder is such that the setting solution is 15–40 parts by weight, preferably 15–35 parts by weight, and more preferably 20–30 parts by weight, based on 100 parts by weight of powder.

Preferably, the powder is selected from the group consisting of tetracalcium phosphate, calcium hydrogen phosphate, tricalcium α-phosphate, tricalcium β-phosphate, and hydroxyapatite.

Other objects, features, and advantages of the present invention will become apparent from the following description.

DESCRIPTION OF PREFERRED EMBODIMENTS

As used herein, the term "pectin" collectively refers to pectin per se, pectic acid, and pectinic acid. Pectin contained in the calcium phosphate cement setting solution of the present invention forms a gel with calcium ions, magnesium ions, or the like Therefore, when the setting solution is incorporated into a powder containing calcium phosphate, the resultant mixture is resistant to disintegration even when it is in contact with body fluids, allowing it to be used and maintain a predetermined shape.

Pectin easily dissolves in water, eliminating need for an acid. Therefore, according to the present invention, pH of the setting solution needs not be as low as would induce an inflammation reaction; in fact, pH may be 3–5, preferably 3.2–3.6. When the reaction causing the cement powder to set takes place within such pH ranges, no inflammation reaction is induced during the course of setting. In addition, the resultant hardened material does not adversely affect living tissue. Furthermore, since the pectin-containing-setting solution has the proper viscosity, the composition resulting from kneading of the setting solution and calcium phosphate powder also has proper viscosity. As a result, the composition can be handled and formed into a predetermined shape with ease. The expression "modification of shape" as used herein refers to modification, adjustment of the shape after the cement mixture is put in a cavity, or the like.

The pectin content in the setting solution is 0.5 to 10% by weight, preferably 0.8 to 5% by weight, particularly preferably 1 to 4% by weight, when the entirety of the setting solution is taken as 100% by weight. If the pectin content is less than 0.5% by weight, the cement powder disperses when the composition comes into contact with body fluid. This causes the composition to disintegrate, and therefore a predetermined shape cannot be maintained. On the other hand, if the pectin content is in excess of 10% by weight, the viscosity of the setting solution increases, which also elevates the viscosity of the resultant composition of the setting solution and calcium cement. The viscosity of the setting solution is preferably equal to or less than 200 dPa·s, more particularly equal to or less than 20 dPa·s, most particularly 0.5 to 5 dPa·s. When the viscosity of the setting solution falls within these preferred ranges, viscosity of the resultant composition can be properly adjusted.

As regards the above-mentioned calcium phosphate powder, there may be used tetracalcium phosphate, calcium hydrogen phosphate, tricalcium α-phosphate, tricalcium β-phosphate, and hydroxyapatite. These powders may be used singly or in combinations of two or more species. Particularly preferably, the powder of the present invention contains tetracalcium phosphate and calcium hydrogen phosphate in combination as dominant components. Use in combination of these two components provides a composition to be set which is more resistant to disintegration and which easily maintains a predetermined shape. These two types of powder are preferably contained in an amount (as a total amount) of not less than 40% by weight, more preferably not less than 80% by weight, with respect to the entirety of the powder (which is regarded as 100%). Although the ratio of tetracalcium phosphate and calcium hydrogen phosphate is not particularly limited, it is preferred that the ratio be approximately equimolar. The composition of the present invention may optionally contain other components such as X-ray imaging agents (e.g., barium sulfate, bismuth subcarbonate, or the like) and seed crystals such as magnesium fluoride and sodium fluoride. Seed crystals are added to reduce the setting time.

Tetracalcium phosphate may be prepared by any suitable method. For example, an equimolar mixture of calcium carbonate and calcium hydrogen phosphate may be molded, at 1450–1550° C., and then granulated to a size of about 100 μm. The calcium hydrogen phosphate used in the present invention may be in the dihydrate or anhydride form. They may be obtained as commercial products, which may further be dehydrated at about 120° C. The viscosity of the composition to be set may be adjusted by modifying the proportions in amount of powder and setting solution. The proportion of the amount of setting solution with respect to that of powder is such that the setting solution is 15–40 parts by weight, preferably 15–35 parts by weight, and more preferably 20–30 parts by weight, based on 100 parts by weight of powder. Too small an amount of the setting solution may result in too high a viscosity of the composition to be set, making it difficult to impart a predetermined shape. Conversely, if the setting solution is used in an excessive amount, the viscosity of the composition to be set becomes low. In this case, although handling of the composition is easy, the powder disperses when the composition comes into contact with a body fluid, inducing disintegration of the composition. In this connection, if the proportion of the setting solution is raised appropriately, while the viscosity of the composition to be set is lowered, the composition can be injected into the bone-lacking portion or fracture portion by use of a syringe. This is advantageous as it lightens the burden on patients.

The composition to be set according to the present invention may be introduced into the living body to form an artificial bone, artificial tooth root, or the like. During kneading of the powder and setting solution, there may be added an osteoplastic factor, an anti-cancer agent, an antibiotic, or other biologically active ingredient to form a sustained release drug, making use of the composition of the invention as a carrier of the drug.

EXAMPLES

Reference Example 1

Pectin was added to pure water in different concentrations as shown in Table 1. Each mixture was stirred to thereby prepare a setting solution, and the pH and viscosity of the solution were measured. The results are shown in Table 1. Independently, each of the resultant solutions (0.25 g) was added to an equimolar mixture (1 g) of tetracalcium phosphate and calcium hydrogen phosphate. The mixture was kneaded for 5 minutes to thereby prepare a composition to be set. Evaluation was made in terms of ease in handling, shape imparting ability, dispersion of the cement powder when the composition is immersed in an artificial body fluid, and occurrence or absence of disintegration of the composition. The pH was measured by use of a hydrogen ion concentration meter of the glass electrode type (Model F-15; by HORIBA). The viscosity was measured at 25° C. by use of a viscometer, model Viscotester VT-04, manufactured by RION. Dispersion of cement powder and occurrence or absence of disintegration of the composition were evaluated by visual observation during immersion of the composition in the artificial body fluid.

TABLE 1

| Pectin content (wt %) | pH | Viscosity (dPa · s) |
| --- | --- | --- |
| 0.1 | 4.2 | — |
| 0.3 | 3.7 | — |
| 0.5 | 3.6 | — |
| 1 | 3.6 | — |
| 2 | 3.4 | 0.6 |
| 4 | 3.4 | 4.5 |
| 6 | 3.3 | 24 |
| 8 | 3.3 | 70 |
| 10 | 3.2 | 190 |
| 15 | 3.2 | — |

Table 1 shows that when the pectin content was 15% by weight, pH was 3.2, which is within the scope of the second aspect of the present invention. However, this product had very high viscosity and thus was difficult to handle. In addition, after the composition was employed for filling, it could not be reshaped; in other words, another shape could not be imparted. In contrast, when the pectin content was 0.3% by weight, the viscosity of the setting solution became very low, permitting easy handling, with another shape being easily imparted. However, when this composition was immersed in an artificial body fluid, the powder instantly dispersed, the composition disintegrated, and thus the composition was found not practical. From these results, the preferred pectin content was determined to be 0.5 to 10% by weight.

Example 1

A 4% by weight aqueous solution (0.21 g) of pectin was added to an equimolar mixture (1 g) of tetracalcium phosphate and calcium hydrogen phosphate, and the resultant mixture was kneaded for 5 minutes. There was obtained a patty-like composition to be set, which was easily imparted with a shape. The composition was molded by use of a metallic die having a cavity of 6 mm inner diameter and 15 mm depth. The mold was removed from the die and immersed in an artificial body fluid. As a result, dispersion of powder and disintegration of the mold did not occur at all. Thus, the shape of the mold was maintained intact. The setting time of the composition measured in accordance with JIS T6602 was 7 minutes and 30 seconds.

Comparative Example 1

Pure water (0.25 g) was added to an equimolar mixture (1 g) of tetracalcium phosphate and calcium hydrogen phosphate, and the resultant mixture was kneaded for 5 minutes. The resultant composition was molded by use of the same type of metallic die as used in Example 1. When the molded composition was immersed in an artificial body fluid, it instantly started to be disintegrated from its surfaces, being unable to maintain its shape. The composition lacked substantial viscosity, and therefore, shape could not be imparted.

Example 2

A 4% by weight aqueous solution (0.21 g) of pectin was added to an equimolar mixture (1 g) of tetracalcium phosphate and calcium hydrogen phosphate, and the resultant mixture was kneaded for 5 minutes. The resultant composition was molded by use of the same type of metallic die as used in Example 1. The molded composition was immersed in an artificial body fluid for 24 hours to thereby obtain a hardened product. Through X-ray diffraction, the hardened product was confirmed to contain hydroxyapatite and tetracalcium phosphate.

Example 3

A 1% by weight aqueous solution (0.3 g) of pectin was added to an equimolar mixture (1 g) of tetracalcium phosphate and calcium hydrogen phosphate, and the resultant mixture was kneaded for 5 minutes. The obtained composition was able to be injected through a 14 gauge syringe. The injected material was immersed in an artificial body fluid for 24 hours to obtain a hardened product. Through X-ray diffraction, the hardened product was confirmed to contain hydroxyapatite and tetracalcium phosphate.

As described above, the present invention provides a setting solution which possesses proper viscosity, which can be easily kneaded and mixed, which has a pH that is not excessively low, and which does not induce adverse effects to the living body with inflammation reactions or the like during setting of the composition. Moreover, the present invention also provides a composition to be set which provides excellent handling ability and shape-imparting ability, and which hardly disintegrates even when it comes in contact with a body fluid immediately after preparation of the composition.

Obviously, numerous modifications and variations of the present invention are possible in light of the above teachings. It is therefore to be understood that within the scope of the appended claims, the present invention may be practiced otherwise than as specifically described herein.

The present disclosure relates to subject matter contained in Japanese Patent Application No. HEI 9-82355, filed on Mar. 3, 1997, which is expressly incorporated herein by reference in its entirely.

What is claimed is:

1. A setting solution for calcium phosphate cement, which solution comprises an aqueous solution of pectin, wherein the content of the pectin with respect to the entirety of the setting solution is 0.5–2% by weight per 100% by weight of the setting solution, and wherein the viscosity of the setting solution is 0.6 dPa·s or less.

2. The setting solution according to claim 1, wherein the pH of the setting solution is 3–5.

3. The setting solution according to claim 1, wherein the pH of the setting solution is 3.2–3.6.

4. The setting solution according to claim 1, wherein the pectin consists essentially of pectin, pectic acid, or pectinic acid.

5. The setting solution according to claim 2, wherein the pectin consists essentially of pectin, pectic acid, or pectinic acid.

6. The setting solution according to claim 3, wherein the pectin consists essentially of pectin, pectic acid, or pectinic acid.

7. A formable composition which comprises a calcium phosphate cement powder and a setting solution, said solution comprising an aqueous solution of pectin, wherein the content of pectin with respect to the entirety of the setting solution is 0.5–2% by weight per 100% by weight of the setting solution and wherein the viscosity of the setting solution is 0.6 dPa·s or less.

8. The composition according to claim 7, wherein the pH of the setting solution is 3–5.

9. The composition according to claim 7, wherein the setting solution is present in an amount from 15–40 parts by weight based on 100 parts by weight of powder.

10. The composition according to claim 7, wherein the pectin consists essentially of pectin, pectic acid, or pectinic acid.

11. The composition according to claim 7, wherein the calcium phosphate cement powder is selected from the group consisting of tetracalcium phosphate, calcium hydrogen phosphate, tricalcium α-phosphate, tricalcium β-phosphate, and hydroxyapatite.

12. The composition according to claim 7, wherein the calcium phosphate cement powder is an equimolar mixture of tetracalcium phosphate and calcium hydrogen phosphate.

13. The composition of claim 7 further including a biologically active ingredient.

14. The composition of claim 13 wherein said biologically active ingredient comprises an antibiotic.

15. The composition of claim 13 wherein said biologically active ingredient comprises an anti-cancer agent.

16. An osteoplastic composition comprising a carrier for a biologically active material, said composition comprising a calcium phosphate cement powder set with an aqueous setting solution of pectin, wherein the content of the pectin with respect to the entirety of the setting solution is 0.5–2% by weight per 100% by weight of the setting solution, and wherein the viscosity of the setting solution is 0.6 dPa·s or less.

17. The composition according to claim 16, wherein the calcium phosphate cement powder is selected from the group consisting of tetracalcium phosphate, calcium hydrogen phosphate, tricalcium α-phosphate, tricalcium β-phosphate, and hydroxyapatite.

18. The composition according to claim 16, wherein the calcium phosphate cement powder is an equimolar mixture of tetracalcium phosphate and calcium hydrogen phosphate.

19. The composition of claim 16 wherein said biologically active ingredient comprises an antibiotic or an anti-cancer agent.

* * * * *